Oct. 11, 1960    W. L. KOCH    2,955,782
ROLL AND PITCH CONTROL APPARATUS
Filed March 12, 1958

INVENTOR.
WALTER L. KOCH
BY *Ralph B. Pastoriza*
ATTORNEY

United States Patent Office 2,955,782
Patented Oct. 11, 1960

2,955,782

ROLL AND PITCH CONTROL APPARATUS

Walter L. Koch, Santa Barbara, Calif., assignor, by mesne assignments, to Curtiss-Wright Corporation, a corporation of Delaware Filed Mar. 12, 1958, Ser. No. 720,988

3 Claims. (Cl. 244—76)

This invention relates generally to control systems which may be either electrically or hydraulically energized, and more particularly to an improved apparatus for controlling the roll and pitch of a missile.

The tendency for missiles and the like to roll while in flight are conventionally controlled by a pair of horizontal control surfaces extending from opposite sides of the missile body and coupled to a suitable actuating mechanism for changing the attitude of the control surfaces in opposite directions. The counterpart to this structure in conventional aircraft takes the form of ailerons. To change the pitch of a missile or aircraft, other control surfaces such as the elevators in an aircraft or tail fin control tabs on a missile are actuated in a single movement either up or down. Generally the control for the pitch is effected by a separate actuating mechanism independently of the roll control.

In any aircraft employing both roll and pitch control, it is possible by a combination of operation of these two controls to steer the missile. In other words, by rolling the missile or aircraft through a given angle and then altering the pitch, the aircraft can be made to execute a turn in azimuth.

The present invention has as its primary object a greatly improved apparatus for actuating only two control surfaces to control both the roll and pitch of an aircraft, particularly high speed missiles.

Other objects of the invention are to provide an improved control apparatus of the above type which incorporates a minimum number of moving parts, requires a minimum amount of power to operate the same, and is less bulky and requires less space than control systems heretofore proposed for performing analogous functions.

Briefly these and many other objects and advantages of this invention are attained by providing a single pair of control surfaces adjacent to the nose portion of the missile and each mounted so that they can independently change their attitude. Suitable control rods for this purpose extend inwardly in opposing relationship within the nose portion of the missile and are supported by a central mounting in such a manner that each is capable of independent rotation with respect to the other. A first actuating means is arranged to move a plunger in a fore and aft direction. This plunger is coupled through a unique arrangement to each of the individual rods so that fore and aft movement of the plunger simultaneously effects a change in attitude of an equal amount but in an opposite sense in the two control surfaces.

Cooperating with the first actuating plunger is a second actuating plunger disposed to move in an up and down direction to swing the first actuating plunger in an arc having a center of curvature falling on the axis of the control rods such that up and down movement by the second actuating plunger results in a simultaneous and equal changing of the attitude of each of the control surfaces in the same direction. Thus, the former control in which the attitudes of the control surfaces are changed in an opposite sense controls the roll of the missile while the latter function controls the pitch.

A better understanding of the preferred embodiment of the invention will be had by referring to the accompanying drawings in which.

Figure 1:
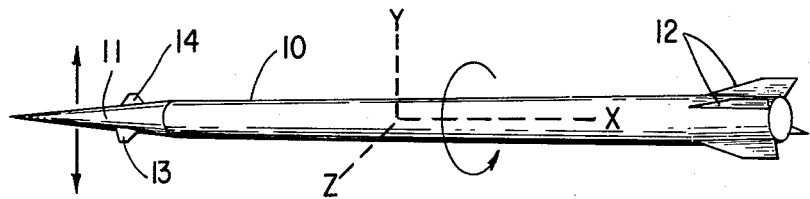
Figure 1 is a perspective view of missile employing control surfaces for controlling its roll and pitch in accordance with the present invention.

Referring first to Figure 1 there is shown a conventional missile 10 having a nose cone portion 11 and tail fins 12. In order to control the roll and pitch of the missile there are provided oppositely extending horizontal control surfaces 13 and 14. In Figure 1 a set of rectangular coordinates has been established in which the $x$-axis coincides with the longitudinal axis of the missile body; the $y$-axis extends vertically and may be considered as the turning or yaw-axis; and the $z$-axis extends laterally and constitutes the pitch-axis. The present invention is primarily concerned with, first, controlling roll of the missile about the $x$-axis as indicated by the arrow, and, second, controlling pitching of the missile about the $z$-axis as indicated by the two arrows adjacent to the nose cone. A combination of these two controls, however, may be employed for turning the missile about the vertical $y$-axis as will be explained when the operation of the system is set forth.

Figure 2:
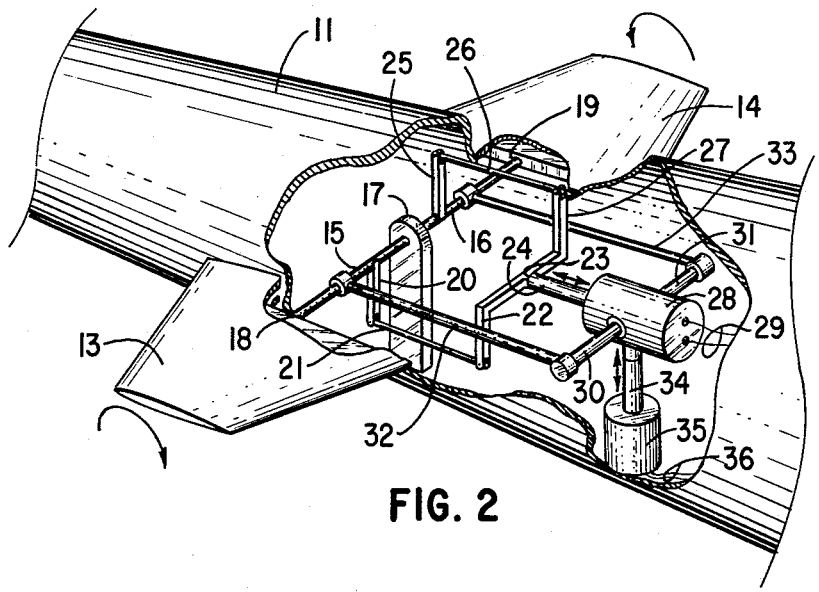
Figure 2 is an enlarged broken away perspective view of the nose portion of the missile illustrated in Figure 1 showing the control apparatus of the invention; and, Figures 3, 4, 5, 6, and 7 are schematic illustrations of the manner in which the missile reacts upon altering the positions of the control surfaces.

Referring now to Figure 2 the control apparatus includes a pair of control rods 15 and 16 extending inwardly to the interior of the nose cone and terminating in a central bearing 17. The bearing 17 individually mounts for rotation the opposing ends of the control rods 15 and 16 so that these rods can rotate independently of each other. The far ends of the control rods 15 and 16 are rigidly secured at 18 and 19 to the control surfaces 13 and 14 so that rotation of either one of these rods will change the attitude of the control surface.

As shown in Figure 2, the control rod 15 is arranged to be rotated by a lever 20 rigidly secured and extending away therefrom in a normal downward direction. The free end of lever 20 is coupled through a swivel joint to a connecting rod 21. The other end of the connecting rod 21 is connected through a similar swivel to a downwardly-directed arm 22 forming part of a T-frame 23 rigidly secured to a first actuating plunger 24. Similarly, the control rod 16 is rigidly secured to one end of a second lever 25 extending upwardly in an opposite direction to that of the lever 20. The upper end of the lever 25 terminates in a swival joint connecting to a second connecting rod 26 the other end of which connects to an upwardly extending arm 27 secured to the opposite portion of the T-frame 23. The plunger 24 may be actuated by any suitable means such as a solenoid 28 arranged to be energized by suitable input leads 29. Alternatively, the actuating mechanism 28 may constitute a hydraulic cylinder incorporating a piston secured to the plunger 24.

As indicated by the arrows in Figure 2, the plunger 24 is arranged to be moved in a back and forth or fore and aft direction. Since the lever elements 20 and 25 extend in opposite directions, movement of the plunger 24 in a forward or rearward direction will result in a rotation of the control rods 15 and 16 in opposite directions with respect to each other. This motion in turn will result in a change in the attitude of the control surfaces 13 and 14 in opposite directions. For example, if the plunger is moved forwardly, the control rod 15 will be rotated in a clockwise direction as viewed from the left side of the missile nose to rotate the control surface 13 in a similar direction and thus increase its attitude. Simultaneously, the control rod 16 will be caused to move in a counter-clockwise direction as viewed from the left and thus change the attitude of the control surface 14 by moving its leading edge downwardly.

The solenoid 28 is mounted for arcuate movement with respect to the axis of the control rods 15 and 16 by a pair of laterally extending members 30 and 31 coupled to the control rods through connecting members 32 and 33. Essentially, the connecting members 32 and 33 constrain movement of the solenoid 28 to a given arc having a radius of curvature which falls on the axis of the control rods 15 and 16. The connection points of these rods are simply journals and in no way are they arranged to engage the control rods for rotating the same.

Disposed below the solenoid 28 is a second actuating plunger 34 connecting to the bottom of the solenoid 28 through a suitable swivel mount and arranged to be moved up and down as indicated by the two headed arrow by a second solenoid 35. Suitable input leads 36 may be provided for energizing the solenoid 35. As in the case of the solenoid 28, a simple hydraulic cylinder could be substituted for the solenoid 35.

By means of the above described arrangement, up and down movement of the second plunger 34 will cause the solenoid 28 to execute an arcuate movement with respect to the axis of the control rods 15 and 16. This movement in turn will be transmitted to both of the control rods through the T-frame 23, respective connecting rods 21 and 26, and levers 20 and 25, so that the control rods 15 and 16 will be rotated simultaneously and in the same direction to follow movement of the solenoid 28. It will be clear that this arcuate movement up and down of the solenoid 28 can be effected entirely independently of the fore and aft movement of the plunger 24 so that both the roll and pitch controls are independently operable but can be actuated simultaneously, if desired.

The manner in which the control apparatus described in Figure 2 can be used to stabilize roll and pitch of the missile as well as effect a turning thereof will be better understood by now referring to the schematic sketches illustrated in Figures 3, 4, 5, 6 and 7.

Figure 3:
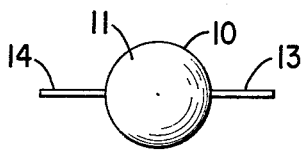
Figure 4:
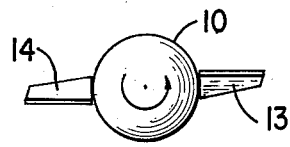

Referring first to Figure 3, the control surfaces 13 and 14 are shown head on in a neutral horizontal position and in this condition, the missile will fly a straight and level course. If now a condition should arise which would tend to cause the missile body 10 to roll, for example, in a clockwise direction as viewed from the nose as shown in Figure 3, the actuating plunger 24 of Figure 2 is caused to move forwardly which will result in an increase in the attitude of the control surface 13 and a decrease of the attitude or downward movement of the leading edge of the control surface 14. These positions of the control surfaces are illustrated in Figure 4 and will tend to cause the missile 10 to rotate in a counter-clockwise direction as indicated by the arrow. This first motion will thus counteract the initial rolling of the missile in a clockwise direction.

Figure 5:
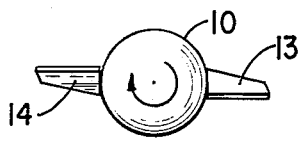

Similarly, should the missile originally tend to roll in a counter-clockwise direction as a result of some external disturbance, the actuating plunger 24 can be retracted or moved rearwardly thereby resulting in the control surface 13 now decreasing its attitude so that its leading edge drops and the control surface 14 increasing in its attitude as shown in Figure 5. This position of the control surfaces will roll the missile in a clockwise direction and thus counteract the initial tendency for the missile to roll in a counter-clockwise direction.

Figure 6:
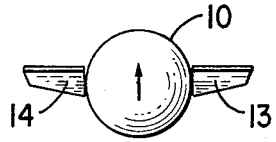
Figure 7:
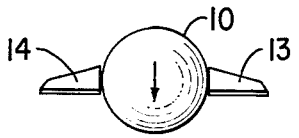

In the event the nose of the missile drops, the second actuating plunger 34 of Figure 2 may be moved downwardly by the solenoid 35 and thus effect an increase in the attitude of both the control surfaces 13 and 14 simultaneously, thereby causing the nose of the missile to rise as indicated by the arrow in Figure 6. Similarly, if the nose of the missile rises, the upward movement of the second actuating plunger 34 will decrease the attitude of both the control surfaces 13 and 14 simultaneously so they assume the downward position shown in Figure 7 to result in a downward movement of the nose.

From the foregoing description it will be evident that some steering control of the entire missile may be had by the simple roll and pitch controls described. For example, if it were desired to turn the missile to the right, the missile could first be cause to roll slightly in a counter-clockwise direction by positioning the control surfaces 13 and 14 as illustrated in Figure 4. While in this position, the pitch control actuating plunger 34 could then be operated to increase the attitude of both of the control surfaces simultaneously such as illustrated in Figure 6 thus tending to move the nose upwardly. However, since the missile is in a roll or a bank, this upward movement would then effect the desired turning. A left hand turn can be executed in a similar manner.

The entire control mechanism is relatively simple and requires substantially no maintenance. Only two energizing means in the form of the solenoid coils 28 and 35 are necessary. As a consequence, the entire apparatus is relatively compact, extremely reliable in operation, and of a minimum weight. All of these characteristics are important and desirable, particularly in the case of high-speed missiles.

Minor modifications that are within the scope and spirit of this invention will readily occur to those skilled in the art. The roll and pitch control apparatus is therefore not to be thought of as limited to the specific embodiment set forth for illustrative purposes.

What is claimed is:

1. A roll and pitch control device for varying the attitude of a pair of horizontal control surfaces extending from opposite sides of an aircraft, comprising, in combination: a first actuating means mounted for back and forth movement in a given direction; first coupling means connecting said first actuating means to said control surfaces for changing their attitude simultaneously and in opposite directions in response to said back and forth movements; a guiding means mounting said first actuating means for swinging movement along an arc transverse to said given direction with the center of curvature of said arc coinciding with the axis of movement of said control surfaces; a second actuating means mounted for up and down movements; and second coupling means connecting said second actuating means to said first actuating means for moving said first actuating means in said arc to effect a change in attitude of said control surfaces simultaneously and in the same direction.

2. A device according to claim 1, in which the first coupling means include control rods connected to said control surfaces respectively; oppositely extending levers secured to said control rods respectively; and connecting rods connecting said levers to said first actuating means for effecting rotation of said control rods in opposite directions upon back and forth movement of said first actuating means and in the same direction upon up and down arcuate movement of said first actuating means.

3. An apparatus for controlling the roll and pitch of an aircraft comprising, in combination: control surfaces extending from opposite sides of the aircraft fuselage; independent control rods rigidly secured to said control surfaces respectively and passing into said sides of the aircraft towards each other; a center bearing mounting individually rotatively supporting the inner opposing ends of said rods so that rotation of either rod about its own axis varies the attitude of the respective control surface secured thereto; a first actuating plunger mounted within said fuselage; means for moving said plunger back and forth in substantially fore and aft directions; a first lever having one end secured to one of said control rods and its other end extending away from said rod in a first direction; a second lever having one end secured to the other of said control rods and its other end extending normally away from said rod in a second direction opposite to said first direction; first and second connecting rods coupled between said other ends of said levers and said plunger respectively so that fore and aft movement of said plunger rotates said control rods in opposite directions simultaneously; a guiding structure comprising a pair of connecting members journaled about said independent control rods and secured to said means for moving said plunger back and forth; a second actuating plunger mounted within said fuselage and coupled to said means for moving said first actuating plunger; and means for moving said second plunger up and down to swing said means for moving said first plunger and said first plunger as a unit through an arc having a center of curvature coinciding with the common axis of said control rods whereby when said second plunger is actuated said control rods are both rotated simultaneously in the same direction through the medium of said levers and first and second connecting rods.

References Cited in the file of this patent

UNITED STATES PATENTS

| | | |
|---|---|---|
| 2,074,395 | Hojnowski | Mar. 23, 1937 |
| 2,304,487 | Stinson | Dec. 8, 1942 |
| 2,523,579 | Lloyd | Sept. 26, 1950 |
| 2,628,045 | Schmidt | Feb. 10, 1953 |

FOREIGN PATENTS

| | | |
|---|---|---|
| 1,055,411 | France | Oct. 14, 1953 |